US012489680B2

(12) United States Patent
Kwapniewski et al.

(10) Patent No.: US 12,489,680 B2
(45) Date of Patent: Dec. 2, 2025

(54) AI/ML-ASSISTED ONE-CLICK MAINTENANCE FOR CLOUD-BASED MOBILE CORE NETWORK FUNCTIONS

(71) Applicants: AT&T Intellectual Property I, L.P., Atlanta, GA (US); AT&T Mobility II LLC, Atlanta, GA (US)

(72) Inventors: Richard T. Kwapniewski, Middletown, NJ (US); Prashant Raghuvanshi, Parker, CO (US); Rajil Malhotra, Olathe, KS (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 571 days.

(21) Appl. No.: 17/881,786

(22) Filed: Aug. 5, 2022

(65) Prior Publication Data

US 2024/0048449 A1    Feb. 8, 2024

(51) Int. Cl.
 *H04L 41/0895* (2022.01)
 *H04L 41/16* (2022.01)
 *H04W 48/18* (2009.01)
 *H04W 60/06* (2009.01)

(52) U.S. Cl.
 CPC .......... *H04L 41/0895* (2022.05); *H04L 41/16* (2013.01); *H04W 48/18* (2013.01); *H04W 60/06* (2013.01)

(58) Field of Classification Search
 CPC .... H04L 41/0895; H04L 41/16; H04W 48/18; H04W 60/06
 See application file for complete search history.

(56) References Cited

U.S. PATENT DOCUMENTS

| | | | | |
|---|---|---|---|---|
| 2017/0126792 | A1* | 5/2017 | Halpern | H04L 43/0894 |
| 2017/0318087 | A1* | 11/2017 | Qiu | H04L 41/0895 |
| 2018/0146031 | A1* | 5/2018 | Li | G06F 9/45558 |
| 2023/0300033 | A1* | 9/2023 | Taware | H04L 67/51 709/220 |
| 2024/0334323 | A1* | 10/2024 | Ozturk | H04W 52/0206 |

* cited by examiner

*Primary Examiner* — Joseph E Avellino
*Assistant Examiner* — Maryam Emadi
(74) *Attorney, Agent, or Firm* — Guntin & Gust, PLC; Erik Boyd

(57) ABSTRACT

Aspects of the subject disclosure may include, for example, identifying a set of network functions operative on a core network of a mobile communications system instantiated on a cloud network, identifying functional dependencies among respective network functions of the set of network functions, defining a sequence by which the set of network functions should be made unavailable prior to a maintenance event, wherein the defining the sequence is based on the functional dependencies, and deactivating respective network functions of the set of network functions according to the sequence. Other embodiments are disclosed.

20 Claims, 9 Drawing Sheets

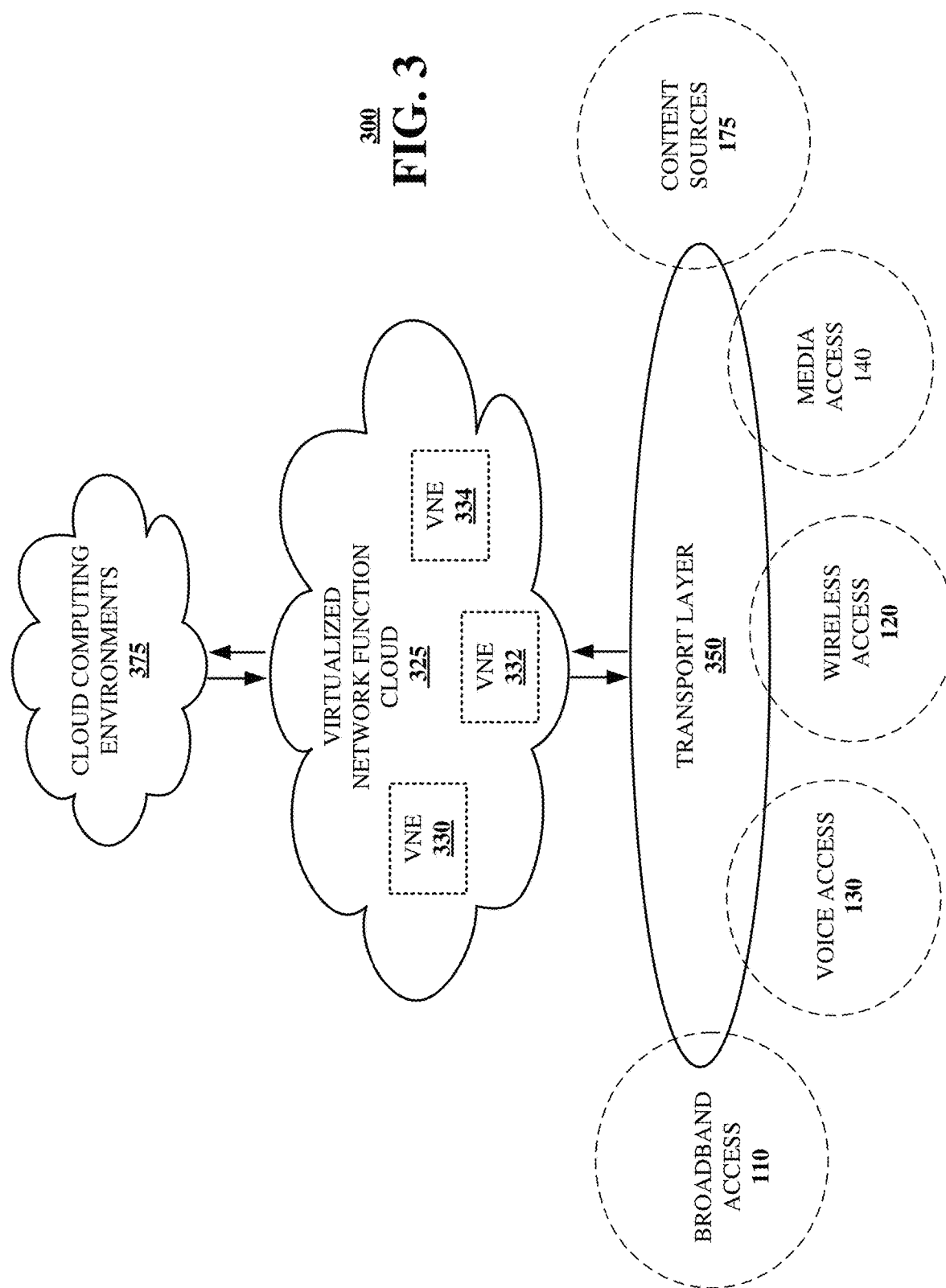

AI/ML-ASSISTED ONE-CLICK MAINTENANCE FOR CLOUD-BASED MOBILE CORE NETWORK FUNCTIONS

FIELD OF THE DISCLOSURE

The subject disclosure relates to system and method for maintenance of cloud-based mobile core network functions.

BACKGROUND

Specifications published by the 3$^{rd}$ Generation Partnership Project (3GPP) for a fifth generation (5G) cellular core network include more than 20 different type types of network functions (NFs) with various interconnectivity requirements between individual NFs. 3GPP includes a number of organizations which develop protocols for mobile telecommunications system s and devices. A mobile core network enables connection by end users with mobile devices to access a radio access network under control of the core network. The core network can include Evolved Packet Core (EPC) and 5G core (5GC) functions. The core network provides NFs such as mobility management, authentication and authorization and policy management.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
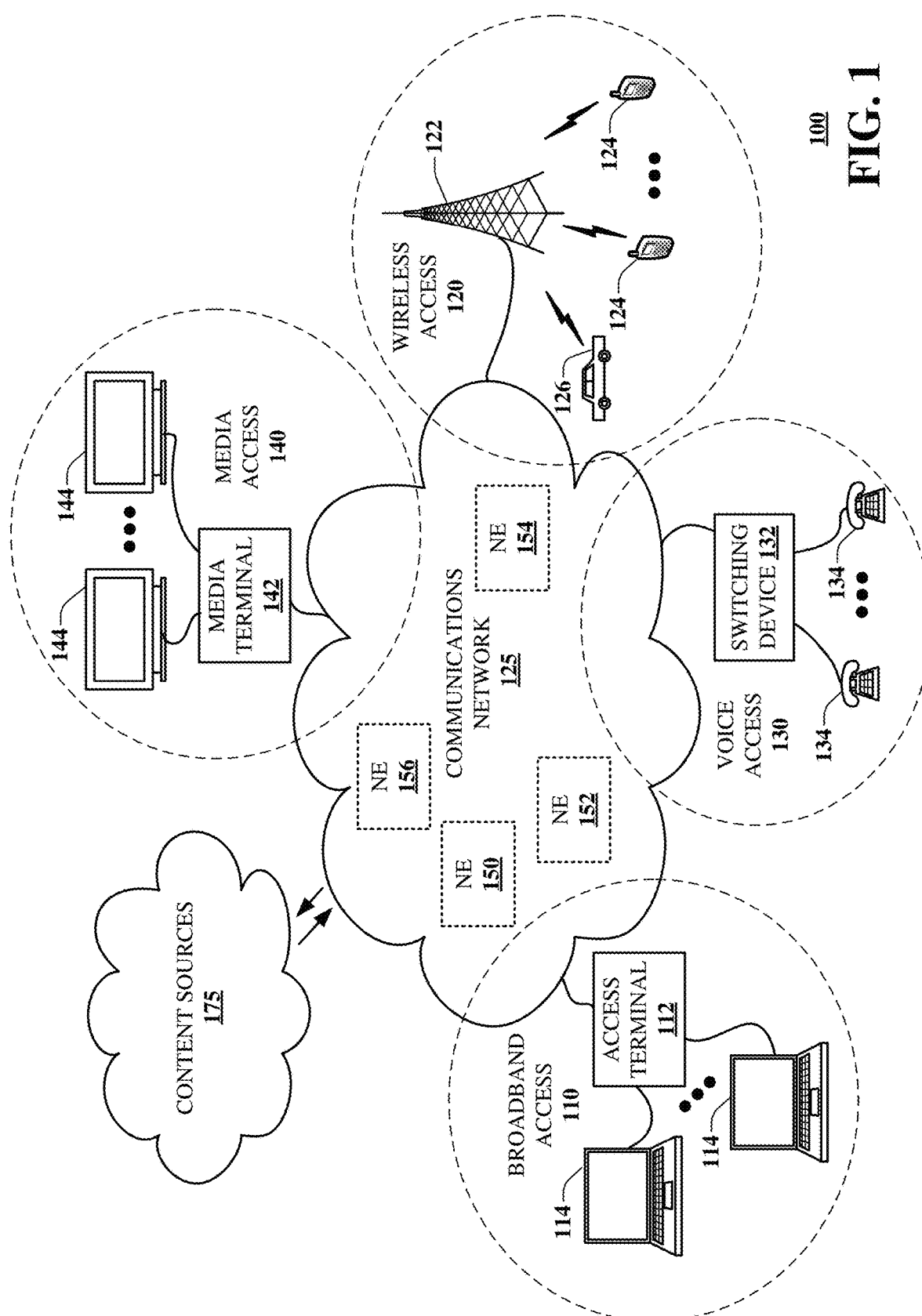
FIG. 1 is a block diagram illustrating an exemplary, non-limiting embodiment of a communications network in accordance with various aspects described herein.

The subject disclosure describes, among other things, illustrative embodiments for identifying a group of related network functions of a core network instantiated on a cloud network. The group of related network functions may be deactivated as a group, considering dependencies among the network functions, for example before performance of a network maintenance event. Subsequently the group of related network functions may be reactivated as a group. The deactivation and reactivation are performed with minimal affect on network activity such as end user traffic. Dependencies among network functions and instantiation of network functions on devices of the cloud network are identified using a machine learning model. Other embodiments are described in the subject disclosure.

One or more aspects of the subject disclosure include receiving an operator instruction to deactivate a group of network functions in a core network of a mobile communications network, the group of network functions including a plurality of virtual network functions operating on a cloud network, identifying functional dependencies among the respective network functions of the group of network functions and identifying one or more compute servers of the cloud network hosting the plurality of virtual network functions. One or more aspects of the subject disclosure further include for each respective network function of the group of network functions, deregistering the respective network function, and confirming a deactivation status for the respective network function.

One or more aspects of the subject disclosure include identifying a set of network functions operative on a core network of a mobile communications system instantiated on a cloud network, identifying functional dependencies among respective network functions of the set of network functions, defining a sequence by which the set of network functions should be made unavailable prior to a maintenance event, wherein the defining the sequence is based on the functional dependencies, and deactivating respective network functions of the set of network functions according to the sequence.

One or more aspects of the subject disclosure include defining a set of related network functions of a core network of a mobile communications system, respective network functions of the set of network functions instantiated as virtual network functions on a cloud network, defining dependencies between the respective network functions of the set of network functions and receiving an operator command to deactivate the set of related network functions. One or more aspects of the subject disclosure further include identifying one or more compute servers of the cloud network hosting the set of related network functions and deactivating respective network functions of the set of related network functions according to a predetermined sequence, wherein the deactivating is responsive to the operator command, wherein the deactivating comprises deactivating each respective network function on a compute server of the one or more compute servers of the cloud network.

Referring now to FIG. 1, a block diagram is shown illustrating an example, non-limiting embodiment of a system 100 in accordance with various aspects described herein. For example, system 100 can facilitate in whole or in part identifying related network functions in the system 100 and dependencies among the network functions, identifying devices of the system 100 on which the network functions are instantiated and deactivating as a group the related network functions. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
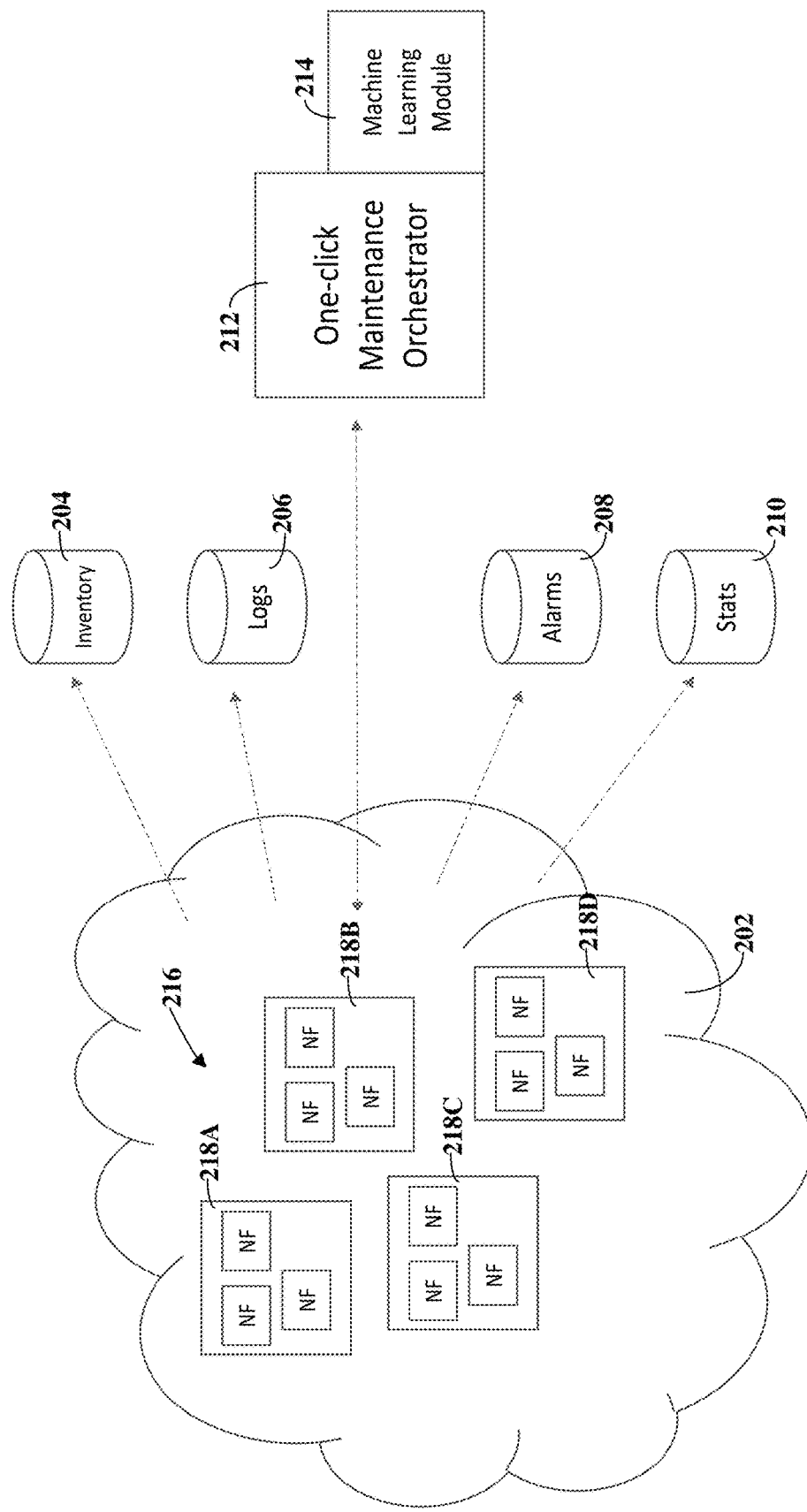
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. The system 200 illustrates a portion of a cloud based mobile network 202 that may form a part of the network which provides wireless access 120 to a plurality of mobile devices 124 and vehicle 126 via base station or access point 122 (FIG. 1). In the exemplary embodiment of FIG. 2A the system 200 further includes data storage including inventory data 204, log data 206, alarm data 208 and statistical data 210. Further, in the exemplary embodiment, the system 200 further includes a maintenance orchestrator 212 and, associated therewith, a machine learning module 214.

The mobile network 202 includes a core network 216. In the example, the core network 216 is virtualized and is cloud native. The core network 216 includes a number of network functions labelled NF in FIG. 2A. The network functions may be standardized functions to provide particular services to devices of the mobile network 202 including user equipment device of end users. The network functions may be grouped in one or more structural groups or functional groups including, in the example group 218A, group 218B, group 218C and group 218D. The network functions may be grouped based on, for example dependency of one or more functions on one or more other functions. Further, the network functions may be grouped based on relationships of functions performed by the respective network functions or based on a cloud server device which instantiates the network functions.

The mobile network 202 includes a mobile communications network and includes or operates in conjunction with one or more radio access networks (RAN) such as wireless access 120 of FIG. 1A to establish reliable connectivity to the network for end users operating mobile device such as mobile devices 124 and provides access to services of the core network. The wireless networks operate according to a published air interface standard and may be referred to as fourth generation (4G) cellular or long-term evolution (LTE) or fifth generation (5G) cellular networks. Further the core network 216 and the mobile network 202 may provide access to other networks such as the public internet through one or more network gateways.

The core network 216 handles a wide variety of essential functions for the mobile network. These network functions (NFs) may include connectivity and mobility management, authentication and authorization, subscriber data management and policy management. The core network can include Evolved Packet Core (EPC) and 5G Core (5GC) functions. 5G Core network functions are generally software-based and designed to be cloud-native. A cloud-native network function is generally a software implementation of a network function that is conventionally performed on a dedicated physical device. The cloud-native functions typically runs inside a container.

For a 5G core network, the 3GPP standards define the network functions (NFs) that may be included in the core network 216. Examples of such functions include access and mobility function (AMF), session management function (SMF), user plane function (UPF), network repository function (NRF), policy control function (PCF), network slice selection function (NSSF). Other examples include authentication server function (AUSF), unified data management (UDM), unified data repository (UDR), network data analysis function (NWDAF), network exposure function (NEF), core charging function (CHF), non-3GPP interworking function N3IWF), short message service (SMSF), unstructured data storage function (UDSF). Other functions may be implemented as well, including combinations of functions as those listed here and later-developed functions.

In addition to defining the network functions, the 3GPP standards further define various interconnectivity requirements between the network functions (NFs). These interconnectivity requirements become even more prominent with the 5G Service-based Architecture (SBA), which introduces the concept of an NF taking a role of a service consumer or a service producer, creating hard dependencies between NF type pairings. Furthermore, the 5G standards have been developed with the principles that the 5G Core would utilize virtualization and be cloud native. 3GPP specifications provide for redundancy, so that, for example, an AMF is dependent on an SMF and there may be multiple SMF instances in the network. If one SMF instance fails, an alternative SMF may be activated. The 3GPP specifications include concepts such as NF registration and discovery to allow NFs to dynamically find one another and allows for multiple NF producers to be candidates for a single NF consumer to provide for resiliency in case of single NF outage.

Mobile Core Network Functions (NFs) which are virtualized or containerized on an underlying cloud computing environment are from time to time subject to maintenance or failure events on the cloud computing environment. There are 3GPP specifications which define how a failure of a single NF can be detected by other NFs, and how a single NF can announce to other NFs that it is available or unavailable by performing a registration or deregistration procedure.

There may be events in the network which affect more than one NF. For example, there may be multiple NFs built within a single cloud computing instance such as a single server. In this scenario, multiple NFs may need to announce that they are unavailable to the network prior to an event that affects them commonly, such as a cloud computing maintenance event. And similarly, following the cloud computing maintenance event, multiple NFs will need to announce that they are again available.

However, when multiple, related NFs are made available or unavailable concurrently, there may be undesirable effects on control plane and user plane communication. For example, there may be dependencies such that a network function NF_A depends on a network function NF_B, and network function NF_B depends on a network function NF_C. In the example, unless all three NFs are available and ready, there may be conditions where a transaction fails. This may trigger a failover process and delay or a disruption to control plane or user plane communication. This in turn may cause an end-user-visible delay or outage and could trigger a signaling storm on the operator's network.

Thus, in some examples, the NFs may be considered to form a chain, where a first NF is dependent on a second NF as consumer and producer. Further, there is a third NF that is dependent on the first NF, forming a chain of dependencies. If some links in the chain are lost or broken because a NF becomes non-functional, then a dependent NF can use a discovery process to find an alternate, redundant NF to take the place in the chain of the non-functional NF. This will return the chain of dependent NFs to operational order again.

Conventional approaches have required manual intervention from human operational personnel, generally from different operational teams for each respective network function. This arrangement requires additional personnel to coordinate the teams. The network operator must manually define all the relationships between NFs and define the proper sequence of operations. Furthermore, this work is generally performed in a maintenance window during a low-volume period for communication traffic such as early morning. Such low-volume periods are generally short-staffed and are far from ideal from a human-factors perspective. With the use of manual procedures, involving multiple teams, all working during early mornings hours, the process may be risky, error-prone and may occur over a long-time duration. Conventional procedures require advanced planning to determine the relationships between NFs sharing the same cloud infrastructure, require coordinating the teams supporting each of the NFs, and require executing error-prone manual procedures.

In a cloud native environment, there is no direct communication between the cloud layer and the 3GPP NF layer to notify NFs of an outage at the cloud layer. Specifically, if there is an outage event of an entire cloud instance (e.g. a single data center maintenance), there may be many NFs, including both consumer and producers, impacted simultaneously. This may result in undesirable impacts on the 5G Core network. In examples, such undesirable impacts may include non-optimal NF selection and signaling storms which cause NF overload and service disruption.

A failure event cannot be controlled and may result in a period where, during a failure, some traffic on the network is dropped before the network is repaired and returned to normal functionality. In contrast in a maintenance event, portions of the network functions are taken down intentionally, breaking links in the chain. However, with knowledge of the chain of NFs and dependencies in the chain, the processes of taking down the portions of the NFs and returning them to service following maintenance can be done gracefully without disruption to the network or traffic on the network that would be visible to end users on the network. As noted, in examples the NFs are built on cloud technology. A maintenance event may include an operation such as an operating system upgrade on the cloud compute server on which the NFs are instantiated. The requirement for the upgrade may mean that multiple NFs have to be disabled simultaneously during the upgrade. It is desirable to minimize the impact of such maintenance events.

Conventionally, when there are such dependencies between NFs, if a network operator desires to minimize impacts before and after a maintenance or failure event, the operator may develop manual procedures for operational personnel to execute. Such manual procedures require coordination among multiple teams responsible for the various NFs. Execution of these procedures can be time consuming and error prone. Execution of the procedures may also need to be done during maintenance windows such as nighttime hours when traffic volume is low, requiring extra personnel to be on duty during difficult time periods.

In accordance with some aspects described herein, the maintenance orchestrator 212 may utilize artificial intelligence (AI) or machine-learning (ML) techniques of the machine learning module 214 to discover the set of NFs which share the same cloud infrastructure failure domain. For example, in a cloud-based network, it can be difficult to identify specifically which network server hosts particular network functions. For example, if a cloud compute server is running the particular function and must be rebooted as part of a maintenance process, the location and identity of the affected cloud compute server must be known. The information about what compute server is used for particular virtualized network functions must be built as a knowledge base for use by the maintenance orchestrator 212. Such information can be gathered and maintained manually but that is difficult in a cloud network instance. The dynamic learning capability of a machine learning function improves the efficiency and accuracy of the process of building and maintaining such knowledge base of information.

Further, the maintenance orchestrator 212, in conjunction with the machine learning module 214, may define relationships and dependencies between those NFs within the set of NFs which share a failure domain and create a logical sequence for graceful activation or deactivation of those NFs. Standards of 3GPP define the network functions that go into a 5G Core. The 3GPP standards define how the NFs are related to each other and cooperate with each other. The 3GPP standards define relationships among the different NFs, including what NF may be a producer for other consumer NFs and what NFs may be a consumer for other producer NFs. However, the 3GPP standards are silent about the linkage between the NFs and the details of the cloud infrastructure, including what specific cloud compute servers implement what specific NF or NFs. The relationships and dependencies define a chain of network functions. The ML or AI functionality can assist in defining what links in that chain are affected when there is a maintenance event or other event. The ML or AI functionality can learn those links and relationships. The cloud consists of real, physical components that implement the virtualized network functions. The ML or AI functionality can create the knowledge to relate the cloud devices and the NFs, and to minimize customer impact on network traffic.

Generally, any cloud based mobile network, including a 5G network, supports enhanced reporting capabilities. Network devices and network functions can share information about logs and alarms and inventories and statistics, etc., to any other network function that wants to consume such information. In the core network 216, network elements communicate such information using appropriate technologies such as a subscription for the information.

In an embodiment then, a machine learning function such as machine learning module 214 within the maintenance orchestrator 212 can subscribe to receive such information from one or more network functions. The information can include information provided to and stored in data storage including inventory data 204, log data 206, alarm data 208, statistical data 210 and others. For example, the inventory data 204 may include lists of machines such as compute servers or routers forming the core network 216, lists of subscribers to mobile network services who are connected to a particular network function and connections among network elements, and others. The log data 206 may include information about what each connected subscriber is engaged in as well as historical information about transactions and events in the network including which device or function performed an action, time stamp information and information about other devices or functions that were involved in the action. The information may be contained in messages or sets of messages communicated among network functions as part of the functioning of the network. The alarm data 208 may include, for example, information about current status of network elements, such as an interface or a microservice which currently offline and that status is reflected in a stored alarm. If a service or device is down or offline, the maintenance orchestrator 212 may be unable to deactivate the device or service during a maintenance period or other time. Further, if other devices or functions are dependent on an offline service or device, the unavailability of a device or service as reflected in an alarm stored in the alarm data may cause the maintenance orchestrator 212 to suspend the procedure. Statistical data 210 may store information that can be interpreted to understand activities in the network. The machine learning module 214 may draw inferences from the statistical data.

Responsive to the subscription, each network function or device provides updated information, on a generally real-time basis, to the machine learning module 214. In that way, the machine learning module 214 could infer what network elements or network functions cooperate with other network elements or network functions or combinations of network elements or network functions. Based on this learned cooperation, the machine learning module 214 may identify network functions which are interdependent and the nature of the dependency.

For example, if the machine learning module 214 determines that a particular instantiation of an access and mobility function (AMF) consistently communicates with a particular instantiation of a session management function (SMF), the machine learning module may identify those particular network function instantiations as being interdependent. Based on further information, such as the flow of queries for information and responses providing requested information, the machine learning module 214 may determine the nature of the dependency, such as which network function is a producer and which network function is a consumer. This information about dependency may be stored for usage when identifying a group of interdependent network functions and when deactivating or reactivating the group of interdependent network functions. Further, as interaction among network functions continues over time, the machine learning module 214 may update its learning about the network.

In some embodiments, if the machine learning module 214 lacks sufficient information to reliably determine the interdependence of a group of network functions, the machine learning module 214 may prompt operational personnel for assistance or for drawing a final conclusion on what network functions may be grouped together and what network functions are dependent on others. Any suitable machine learning model, such as a neural network, may be used to implement machine learning module 214.

In the present context, graceful activation or graceful deactivation involves changing the state of the NFs without disruption to the mobile network 202 or traffic on the mobile network 202 that would be visible to end users on the mobile network 202. The maintenance orchestrator 212 establishes communication to each NF to execute the NF-specific activation, deactivation, or status monitoring commands, and operates semi-autonomously under the ultimate control of operational personnel. In the present context, the maintenance orchestrator 212 may be termed a one-click maintenance orchestrator and the term one-click is intended to convey that the processes performed by the maintenance orchestrator 212 operate generally automatically and autonomously with minimal interaction and control by the operational personnel.

Thus, in a first operation, the maintenance orchestrator 212 operates to discover the set of NFs which share the same cloud infrastructure failure domain. For example, the maintenance orchestrator 212 obtains information defining the physical map and the logical map for the mobile network 202. The physical map may define physical communication connections among equipment of the mobile network 202. The logical map may define how respective network functions cooperate with other network functions, including dependencies and redundancies. For example, a first NF may be a consumer of information generated by a second NF which may be considered a producer. The first NF is then dependent on the second NF. Because of this dependency, and to handle potential network failures, a third NF may be assigned as a redundant backup to the second NF. In the event of a network failure impacting the second NF, the first NF will look to the third, redundant NF to step in and continue operating in the place of the failed second NF.

In a further embodiment of this first operation, the maintenance orchestrator 212 may utilize AI or ML techniques of the machine learning module 214 to develop the physical map of the mobile network 202 or the logical map of the mobile network 202.

Figure 2B:
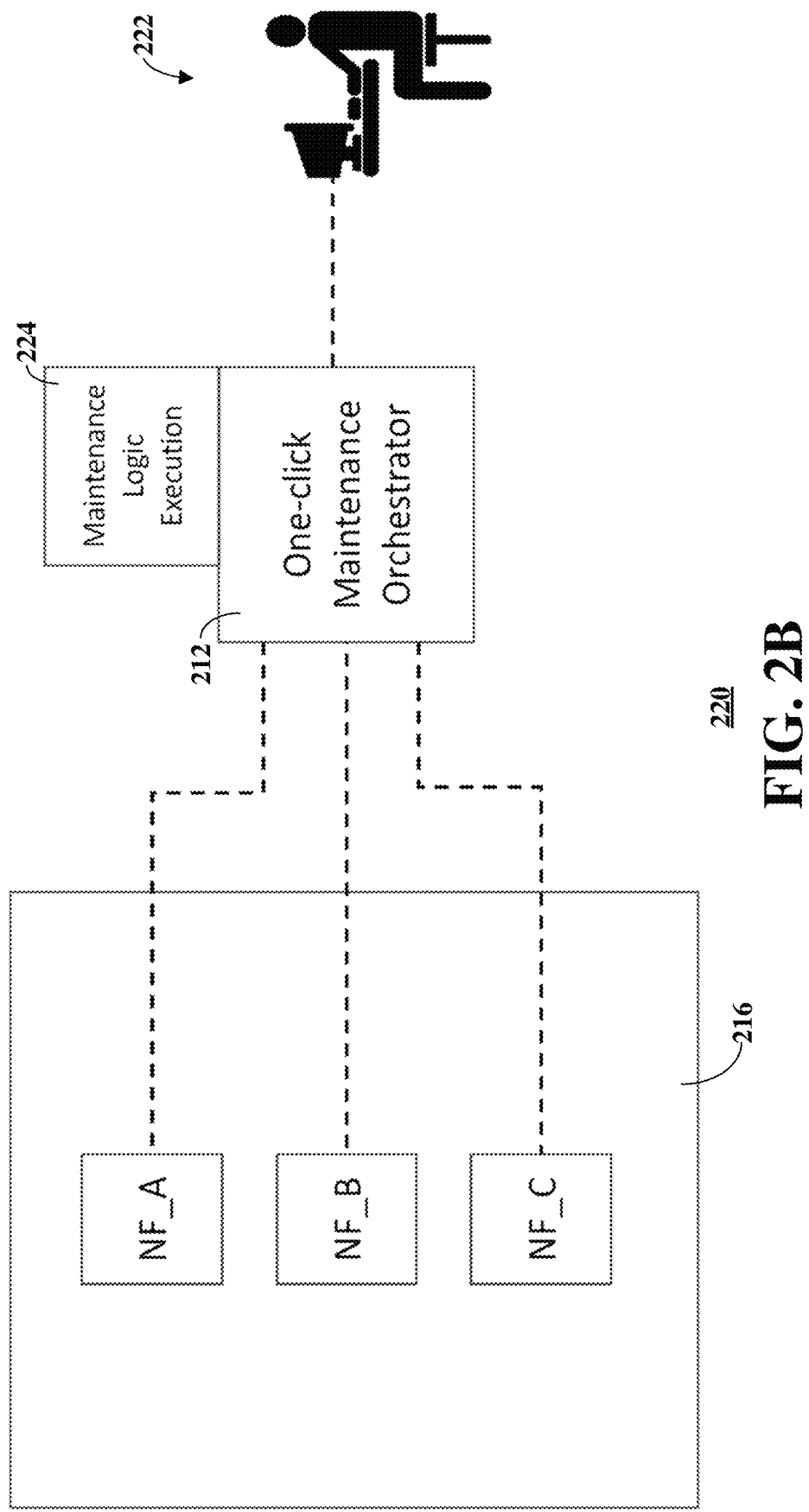
FIG. 2B is a block diagram illustrating an example, non-limiting embodiment of a system functioning within the communication network of FIG. 1 in accordance with various aspects described herein.

FIG. 2B is a block diagram illustrating an example, non-limiting embodiment of a system 220 functioning within the communication network of FIG. 1 in accordance with various aspects described herein. In FIG. 2B, the core network 216 includes three network functions designated NF_A, NF_B, and NF_C. The network functions operate together. The maintenance orchestrator 212 develops an understanding, through machine learning or otherwise, of the functional connections between the three network functions. The network functions are dependent on each other such that NF_C is dependent as a consumer on NF_B as a producer and NF_B is dependent as a consumer on NF_A as a producer. The maintenance orchestrator 212 is in data communication with the network functions NF_A, NF_B, and NF_C. The connection between the maintenance orchestrator 212 and the network functions NF_A, NF_B, and NF_C may include an operation-administration-maintenance (OAM) interface, for example. The network functions may have different means for communication such as an application programming interface (API), for example. The maintenance orchestrator may be tailored for communication with each particular interface.

The maintenance orchestrator 212 operates under control of operational personnel 222. Operational personnel 222 includes an operational device such as a personal computer that is in data communication with elements of the core network 216. The operational personnel 222 may initiate a maintenance or other procedure of the maintenance orchestrator 212 and may monitor the progress and results of the procedure using the operational device. For example, as network functions become deactivated, that information may be reported to the operational device. Separately, as network functions are later reactivated, successful reactivation may be reported to the operational device to suitably inform the operational personnel.

The maintenance orchestrator 212 implements maintenance logic 224. For example, maintenance logic 224 may be designed to deactivate the network functions NF_A, NF_B, and NF_C during performance of a maintenance operation. In this context, a maintenance operation includes any operation in which one or more network functions is intentionally taken offline to accomplish some network purpose. Network purposes include, for example, installation of additional server devices or upgrading an operating system on one or more servers. In an example, the following pseudocode illustrates one embodiment for deactivation of a group of network functions. In the example, the network functions are interdependent in some manner and share the same cloud infrastructure domain.

Example Logic: Deactivation (Pseudocode)
    1. Deactivate NF_A
        a. Validate whether NF_A has been successfully deactivated
            i. If yes, continue to step 2
            ii. If no, retry (1a) twice, and if still not successful, follow error procedure
    2. Deactivate NF_B
        a. Validate whether NF_B has been successfully deactivated
            i. If yes, continue to step 3
            ii. If no, retry (2a) twice, and if still not successful, follow error procedure
    3. Deactivate NF_C
        a. Validate whether NF_C has been successfully deactivated
            i. If yes, continue to step 4
            ii. If no, retry step (3a) twice, and if still not successful, follow error procedure
    4 . . . .

Example Error Procedure:
    A. Halt execution of sequence
    B. Write current state to a log
    C. Trigger an alert to operational personnel (alarm, email)

The maintenance orchestrator 212 communicates with each respective network function and, in sequence, deactivates each respective network function. In this example, at step 1, the maintenance orchestrator 212 initially deactivates network function NF_A. This may be done, for example, by the maintenance orchestrator 212 instructing the network function NF_A to deregister or take itself out of service. In another example, a specified maintenance operation may specify one or more particular infrastructure hosts. The network functions operating on the specified one or more hosts may include a particular list of network functions including NF_A, NF_B, and NF_C and the list of network functions may include a set of predetermined dependencies. Deactivation may involve any suitable number of processes including terminating processes that are currently running on a server and breaking connections with interdependent processes on the same or another server. For example, a dependent process may be waiting for a result produced by NF_A and the dependent process must be advised that NF_A is being deactivated and to look elsewhere for the result.

Step 1a includes a determination whether network function NF_A has been successfully deactivated. If yes, in step 1b, control proceeds to step 2. If not, step 1a may be retried to attempt to successfully deactivate NF_A. For example, a process may not be successfully deactivated if the process is waiting on data or a result from another process for completion, and the data or result is not available. If after retrial, such as two retrial attempts, an error process may be accessed.

Step 2 is initiated if NF_A has been successfully deactivated. In step 2, the maintenance orchestrator 212 deactivates function NF_B. Step 2a includes a determination whether function NF_B has been successfully deactivated. If so, control proceeds to step 3. If not, and NF_B has not been successfully deactivated, the process to deactivate NF_B may be retried a suitable number of times, such as twice. If NF_B is deactivated upon retrial of step 2a, control proceeds to step 3. Otherwise, if NF_B has not been deactivated after retrial, an error process may be accessed.

Step 3 is initiated after NF_B has been successfully deactivated. In step 3, the maintenance orchestrator 212 deactivates function NF_C. Step 3a includes a determination whether function NF_C has been successfully deactivated. If so, control proceeds to step 4 for deactivation of additional network functions, if any. If not, and NF_C has not been successfully deactivated, the process of step 3 to deactivate NF_C may be retried a suitable number of times, such as twice. If NF_C is deactivated upon retrial of step 3a, control proceeds to step 4 for deactivation of additional processes, if any. If there are no additional processes, the deactivation process may terminate. Otherwise, if NF_C has not been deactivated after retrial, an error process may be accessed.

The example deactivation process also illustrates an example error process. The error process can be initiated if attempts to deactivate any process are not successful for any reason. At step 4A, the error process begins by halting execution of a sequence of instructions. This may be done in any suitable way, such as interrupting a processing system from further operation. At step 4B, data representing the current state may be written to a log for possible recovery later. At step 4C, an alert may be provided to operational personnel overseeing the process. The alert may be in any suitable format such as a text message prompting the operational personnel to investigate or to note the error condition.

Figure 2C:
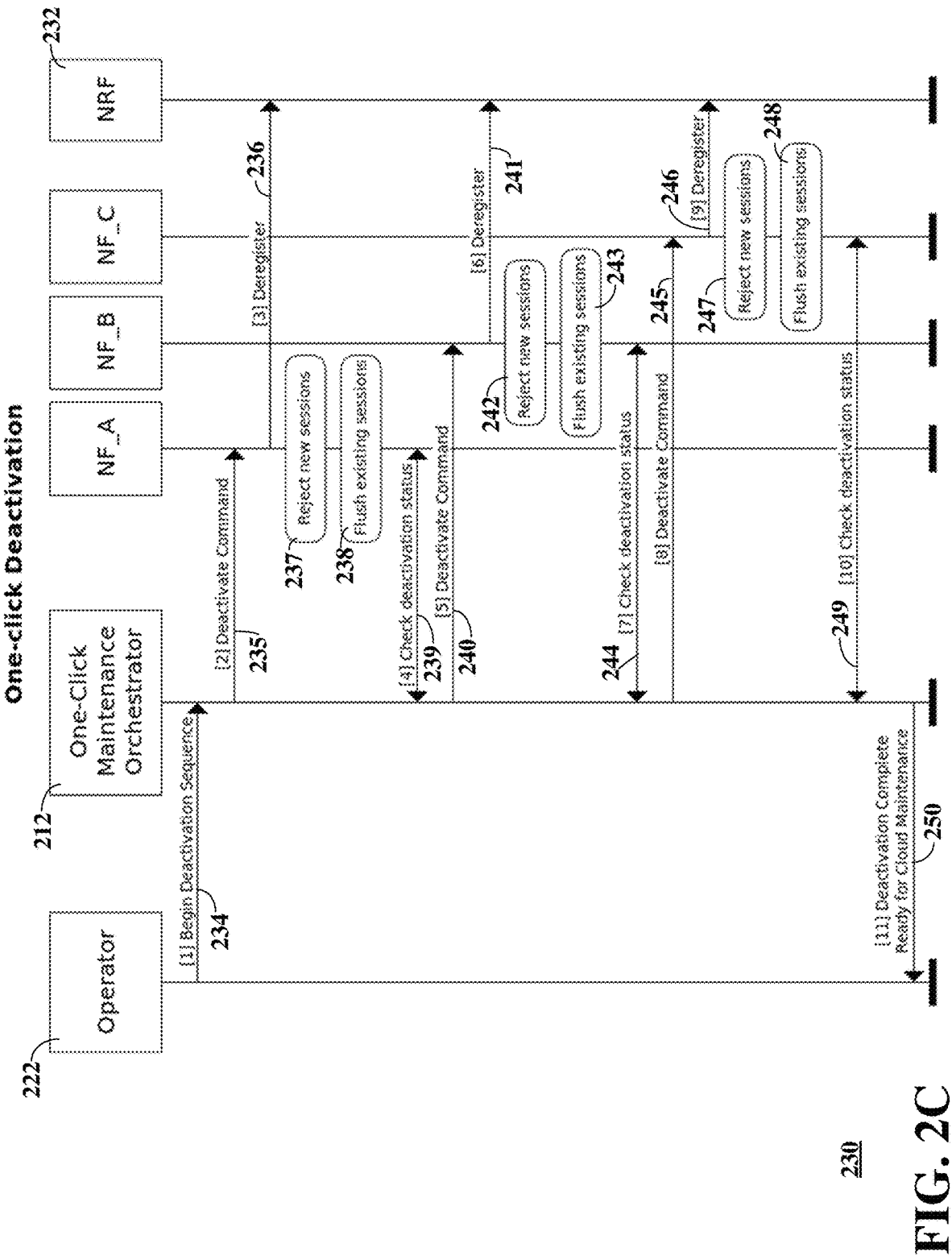
FIG. 2C depicts an illustrative embodiment of a method in accordance with various aspects described herein.

FIG. 2C depicts an illustrative embodiment of a method 230 in accordance with various aspects described herein. The method 230 may be performed in conjunction with the system 220 of FIG. 2B for one-click deactivation of a group of network functions in a mobile network such as the mobile network 202 of FIG. 2A. In the example of FIG. 2C, three network functions designated NF_A, NF_B and NF_C are deactivated. In other examples, any number of network functions may be deactivated in a common operation. In this example, NF_A, NF_B, and NF_C are network functions built on the same cloud infrastructure instance, such as the same data center, and all subject to the same failure domain. Further, there is functional dependency among the network functions. Network function NF_A is a consumer of producer network function NF_B and network function NF_A is a consumer of producer network function NF_C.

The method 230 may provide a one-click, semi-autonomous maintenance orchestrator function for a mobile network operator to coordinate the deregistration of a set of network functions (NFs) before a planned activity such as a maintenance event. The method 230 enables minimal disruption to end-user service and minimal involvement by operational personnel. In embodiments, the method 230 provides an artificial intelligence/machine learning (AI/ML) driven approach to perform a semi-autonomous way of performing network element bring-up and bring-down actions. Such actions can be triggered, for example, by different events like overload, network outage, critical alarm, planned maintenance etc. Embodiments of the method 230 omit errors that a manual process may have due to human interaction and incorrect inputs. The system which implements the method 230 can be self-learning and based on collected data from past events, can self-learn and improve the orchestration.

The method 230 may be performed by the operational personnel 222 including, for example, an operational device such as a personal computer in communication with a maintenance orchestrator 212. The maintenance orchestrator 212 interacts with the network functions NF_A, NF_B and NF_C to deactivate the network functions.

Further, the network functions interact with a particular network function, network repository function 232 or NRF 232. NRF 232 provides network function service registration and discovery and enables network functions to identify appropriate services in one another. The NRF 232 provides a record of all network functions available in the mobile network 202 along with a profile of each network function and the services each network function support. When a network function is brought up for the first time, the network function can be configured to register itself with the NRF 232. The registration includes providing to the NRF 232 information about the network function types that are served and particular subscriber types that are served, among other information. The NRF 232 retains this information about devices and NFs currently active in the network. When other NFs need to find a particular NF producer for example, the other NFs may query the NRF 232 for suitable network functions available in the network.

In the method 230, at step 234, the operational personnel 222 including an operational device begins the process of the deactivation sequence. In this example, the initiation may be due to a scheduled maintenance process in the network. At step 234, the operational device communicates with the maintenance orchestrator 212 to begin the sequence.

As an initial process, the maintenance orchestrator 212 obtains information about logical configuration of the network, the physical configuration of the network, or both. Further, the maintenance organizer obtains information about dependencies in the network functions of the network. In embodiments, the maintenance orchestrator 212 uses AI/ML techniques to develop information about the network and network functions. In embodiments, the maintenance orchestrator 212 may communicate with one or more data sources of the network operator. Such data sources may include inventory databases, log collection systems, fault or performance instrumentation systems. Alternatively or in addition, the maintenance orchestrator may directly access the NFs themselves. Further, the maintenance orchestrator 212 may define a set of related NFs {NF_A, NF_B, NF_C, . . . }. Still further, the maintenance orchestrator 212 may define dependencies between the NFs. In an example, NF_A is dependent on NF_B (i.e. NF_A is a consumer of producer NF_B); NF_B is dependent on NF_C (i.e. NF_B is a consumer of producer NF_C). The maintenance orchestrator 212 may further define a sequence by which NFs should be made unavailable before a maintenance event. The maintenance orchestrator 212 may further define a sequence by which NFs should be made available after a maintenance event. Aspects of this feature are illustrated in conjunction with FIG. 2D. The sequence by which NFs should be made unavailable before a maintenance event and the sequency y which NFs should be made available after the maintenance event may also be applicable for the initial, day one instantiation of the set of NFs.

In further embodiments, the maintenance orchestrator 212 may define a set of validation tests to be executed between each step in the sequence of method 230. Such tests include the capability to define a set of "if . . . else-if . . . then . . . " statements describing the actions if the validation test is successful or not. For example, if a test is successful, the logic of the maintenance orchestrator 212 would generally indicate movement to the next step in sequence. In contrast, if a test is not successful, the logic of the maintenance orchestrator 212 may include a retrial after some time period, a logic branch to another sequence of actions, or a halt to the procedure, among other options. The actions may include writing a log message, sending an email, raising an alert to the operational personnel, etc.

In further embodiments, the maintenance orchestrator 212 may communicate with each NF to trigger a registration or deregistration capability present in the NF-specific implementation, assuming that each NF implements a capability to register or deregister itself using standards-based procedures. This further assumes that each NF implements an operational interface for a remote system to trigger this capability. Examples of such an interface can include a command-line interface (CLI), NETCONF, which is a protocol to install, manipulate and delete configuration of network devices, simple network management protocol (SNMP), extensible markup language (XML), a REST application programming interface (API), or a custom API.

In further embodiments, the maintenance orchestrator 212 may communicate with each NF to execute one or more validation tests to verify that the NF has completed its registration or deregistration and is ready for next steps. Such operations may use the same NF operational interface noted above.

In further embodiments, the maintenance orchestrator 212 may provide a simple user interface for an operational staff member to trigger the start of the maintenance event sequence, using a one-click or push-button method at the user interface. The operator can also monitor the status, and halt or roll back the sequence at any time. The maintenance orchestrator 212 can be a standalone element, or it can be integrated with another existing network functions.

At step 235, the maintenance orchestrator 212 communicates with the top-level function in the chain of network functions, NF_A. The communication may be through a command line interface, an application program interface or other suitable interface. The maintenance orchestrator 212 communicates a suitable deactivation command to the network function NF_A. This may include a single command or multiple commands. The multiple commands may include an initial command for the network function NF_A to deregister from the NRF 232, step 236. The deregistration process may be a standard routine according to established network protocols. Once the network function NF_A deregisters from the NRF 232, the NRF 232 will no longer advertise availability of the network function NF_A to other network functions. It is no longer provided by the NRF 232 as an option to any consumers that might need network function NF_A. The deregistration at step 236 may be confirmed by the NRF 232.

At step 237, the network function NF_A begins to reject new sessions. There might still be some network functions that, for example, cached the identifying information for the network function NF_A and retain awareness of the network function. Rather than accept any new requests from any consumer network functions, the network function NF_A begins rejecting any new session requests that might be received. The rejection from network function NF_A will be received by another consumer network function which will either access information about other suitable network functions previously received from the NRF 232 or will request new information about other suitable network functions to take the place of network function NF_A.

At step 238, the network function NF_A will flush existing sessions. The network session NF_A will operate to end any sessions with other consumer network functions. The network function NF_A will communicate with such existing network functions information that it is ending the existing session. In some applications, existing network functions are replicated with another device that operates as a mated pair with the existing function. In the event a network function such as NF_A is deactivated, the mated pair device can continue functioning as the primary device in the absence of the network function NF_A that is taken offline for maintenance. If the method 230 of FIG. 2C is performed during a maintenance window or time of relatively low traffic in the network, taking the network function NF_A offline should not be apparent to the end user.

At step 239, the maintenance orchestrator 212 confirms the deactivation status. This confirmation may be performed in any suitable manner. For example, the maintenance orchestrator 212 may query the network function NF_A to verify its status, for example at a predetermined time delay after issuance of the deactivation command at step 235. In another example, the network function NF_A may automatically report its status at step 239 upon completion of step 236, step 237, step 238 and any other processes required for deactivation.

At step 240, following confirmation that the network function NF_A has been deactivated, the maintenance orchestrator 212 issues a deactivate command to network function NF_B. Similar to the process for network function NF_A, at step 241, the network function NF_B deregisters from the NRF 232. At step 242, the network function NF_B begins rejecting new sessions requested by other network functions. At step 243, the network function NF_B flushes any existing sessions and redirects other functions participating in such sessions, if any, to other network functions or to the NRF 232. At step 244, the maintenance orchestrator 212 confirms that the network function NF_B has been deactivated.

Similar steps may be repeated for the network function NF_C and any other interdependent network processes. Thus at step 245, following confirmation that the network function NF_B has been deactivated, the maintenance orchestrator 212 issues a deactivate command to network function NF_C. Similar to the process for network function NF_A, at step 236 and for network function NF_B at step 241, at step 246 the network function NF_C deregisters from the NRF 232. At step 247, the network function NF_C begins rejecting new sessions requested by other network functions. At step 248, the network function NF_C flushes any existing sessions and redirects other functions participating in such sessions, if any, to other network functions or to the NRF 232. At step 249, the maintenance orchestrator 212 confirms that the network function NF_C has been deactivated.

At step 250, the maintenance orchestrator 212 confirms to the operational personnel 222 that the deactivation of the group of dependent network functions has been successfully completed and the network functions are ready for cloud maintenance. Throughout the steps of method 230, if error conditions arise, the method may include reporting the error condition to the operational personnel 222 for further handling.

Figure 2D:
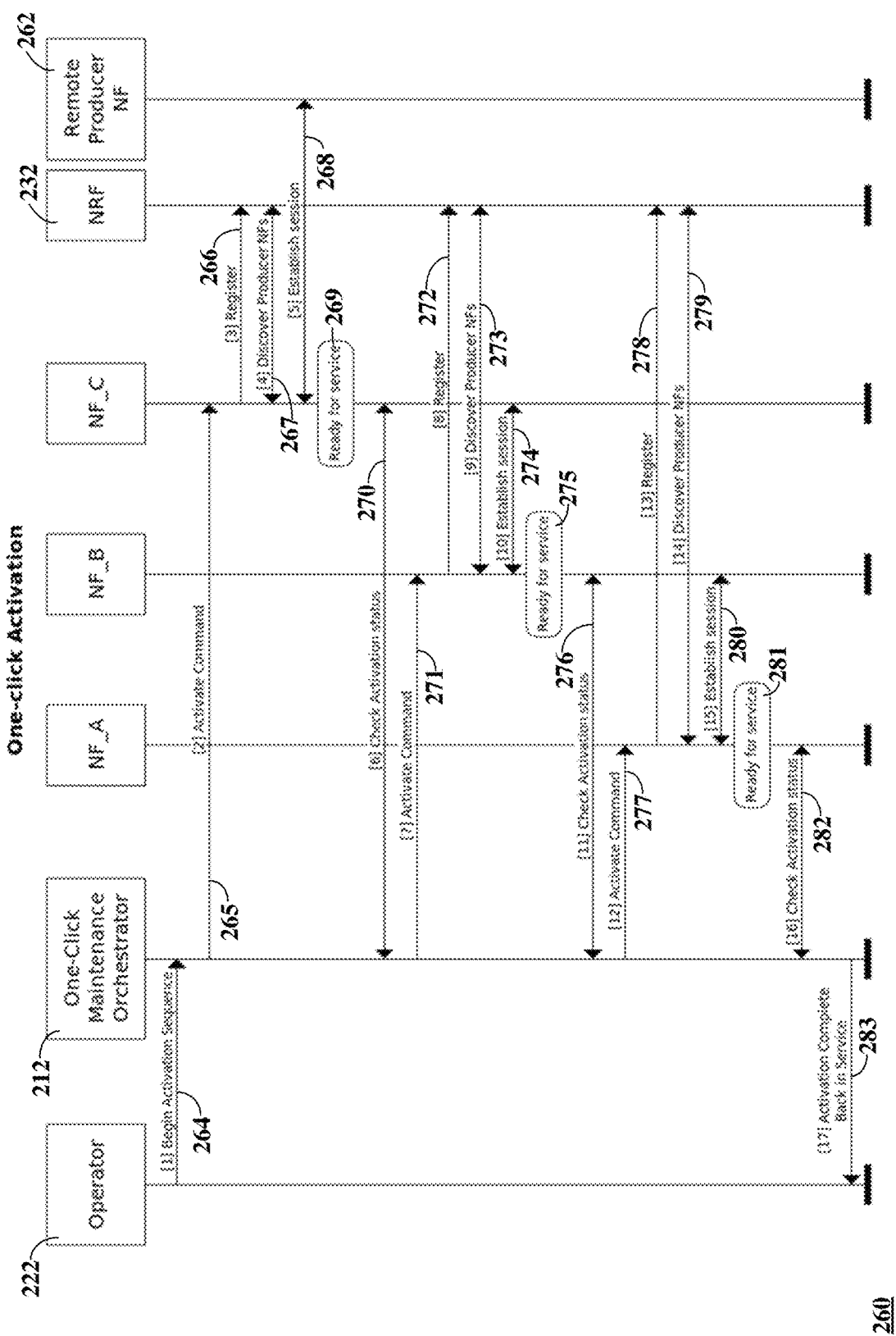
FIG. 2D depicts an illustrative embodiment of a method in accordance with various aspects described herein.

FIG. 2D depicts an illustrative embodiment of a method 230 in accordance with various aspects described herein. The method 230 may be performed in conjunction with the system 220 of FIG. 2B for one-click activation of a group of network functions in a mobile network such as the mobile network 202 of FIG. 2A. In the example of FIG. 2D, three network functions designated NF_A, NF_B and NF_C are activated as a group. In other examples, any number of network functions may be activated in a common operation. In this example, NF_A, NF_B, and NF_C are network functions built on the same cloud infrastructure instance, such as the same data center, and all subject to the same failure domain. Further, there is functional dependency among the network functions. Network function NF_A is a consumer of producer network function NF_B and network function NF_A is a consumer of producer network function NF_C.

The method 260 may provide a one-click, semi-autonomous maintenance orchestrator function for a mobile network operator to coordinate the registration or re-registration of a set of interdependent network functions (NFs) following a planned activity such as a maintenance event.

The method 260 may be performed by the operational personnel 222 including, for example, an operational device such as a personal computer in communication with a maintenance orchestrator 212. The maintenance orchestrator 212 interacts with the network functions NF_A, NF_B and NF_C to activate the network functions.

As shown in FIG. 2D, the network functions interact with a particular network function, network repository function 232 or NRF 232. NRF 232 provides network function service registration and discovery and enables network functions to identify appropriate services in one another. In the example of FIG. 2D, the network function NF_C is a consumer of a remote producer network function 262. The network function NF_C receives information and data generated by remote producer network function 262.

In the method 260, at step 264, the operational personnel 222 including an operational device begins the process of the activation sequence. In this example, the initiation may follow a scheduled maintenance process in the network. At step 264, the operational device communicates with the maintenance orchestrator 212 to begin the sequence.

As an initial process, the maintenance orchestrator 212 obtains information about logical configuration of the network, the physical configuration of the network, or both. Further, the maintenance orchestrator 212 obtains information about dependencies in the network functions of the network. In embodiments, the maintenance orchestrator 212 uses AI/ML techniques to develop information about the network and network functions. In embodiments, the maintenance orchestrator 212 may communicate with one or more data sources of the network operator. Such data sources may include inventory databases, log collection systems, fault or performance instrumentation systems. Alternatively or in addition, the maintenance orchestrator may directly access the NFs themselves. Further, the maintenance orchestrator 212 may define a set of related NFs {NF_A, NF_B, NF_C, . . . }. Still further, the maintenance orchestrator 212 may define dependencies between the NFs. In an example, NF_A is dependent on NF_B (i.e., NF_A is a consumer of producer NF_B); NF_B is dependent on NF_C (i.e., NF_B is a consumer of producer NF_C). The maintenance orchestrator 212 may further define a sequence by which NFs should be made unavailable before a maintenance event. The maintenance orchestrator 212 may further define a sequence by which NFs should be made available after a maintenance event. The sequence by which NFs should be made unavailable before a maintenance event and the sequency y which NFs should be made available after the maintenance event may also be applicable for the initial, day one instantiation of the set of NFs.

In further embodiments, the maintenance orchestrator 212 may define a set of validation tests to be executed between each step in the sequence of method 260. Such tests include the capability to define a set of "if . . . else-if . . . then . . . " statements describing the actions if the validation test is successful or not. For example, if a test is successful, the logic of the maintenance orchestrator 212 would generally indicate movement to the next step in sequence. In contrast, if a test is not successful, the logic of the maintenance orchestrator 212 may include a retrial after some time period, a logic branch to another sequence of actions, or a halt to the procedure, among other options. The actions may include writing a log message, sending an email, raising an alert to the operational personnel, etc.

In further embodiments, the maintenance orchestrator 212 may communicate with each NF to trigger a registration or deregistration capability present in the NF-specific implementation, assuming that each NF implements a capability to register or deregister itself using standards-based procedures. This further assumes that each NF implements an operational interface for a remote system to trigger this capability. Examples of such an interface can include a command-line interface (CLI), NETCONF, SNMP, XML, a REST application programming interface (API), or a custom API.

In further embodiments, the maintenance orchestrator 212 may communicate with each NF to execute one or more validation tests to verify that the NF has completed its registration or deregistration and is ready for next steps. Such operations may use the same NF operational interface noted above.

In further embodiments, the maintenance orchestrator 212 may provide a simple user interface for an operational staff member to trigger the start of the maintenance event sequence, using a one-click or push-button method at the user interface. The operator can also monitor the status, and halt or roll back the sequence at any time. The maintenance orchestrator 212 can be a standalone element, or it can be integrated with another existing network functions.

At step 265, the maintenance orchestrator 212 communicates with the top-level function in the chain of network functions, NF_C. The communication may be through a command line interface, an application program interface or other suitable interface. The maintenance orchestrator 212 communicates a suitable activation command to the network function NF_C. This may include a single command or multiple commands. The multiple commands may include an initial command for the network function NF_C to register with the NRF 232, step 266. The registration process may be a standard routine according to established network protocols. Once the network function NF_C registers with the NRF 232, the NRF 232 will begin advertising availability of the network function NF_C to other network functions. The NRF 232 begins communicating information about the network function NF_C as an option to any consumers that might need network function NF_F. The registration at step 266 may be confirmed by the NRF 232.

At step 267, the NRF 232 looks for producer network functions that can cooperate with the newly registered network function NF_C. The network function NF_C requires certain input information based on the function performed by the network function NF_C. The NRF 232 has access to information about other network functions and their requirements and capabilities and status in the network. In the example, the NRF 232 locates the remote producer 262 network function as a possible producer network function for the newly registered network function NF_C.

At step 268, prompted by the NRF 232, the network function NF_C and the remote producer 262 network function together establish a session. The process of establishing a session between the two network functions can be according to any suitable procedure and may be defined by one or more 3GPP procedures.

At step 269, the newly registered network function NF_C is considered ready for service. For example, the network function NF_C may perform some self-check routines to confirm that it is ready for service. In embodiments, the network function NF_C or the maintenance orchestrator 212 may use a simulation tool or other device including hardware, software or a combination, to run tests against the network function NF_C to ensure that it is ready for service.

At step 270 the maintenance orchestrator 212 may confirm the activation status of the network function NF_C. This confirmation may be performed in any suitable manner.

For example, the maintenance orchestrator 212 may query the network function NF_C to verify its status, for example at a predetermined time delay after issuance of the activation command at step 265. In another example, the network function NF_C may automatically report its status at step 270 upon completion of step 236, step 268, step 268 and any other processes required for activation.

At step 271, following confirmation that the network function NF_C has been activated or reactivated, the maintenance orchestrator 212 issues an activate command to network function NF_B. Similar to the process for network function NF_C, at step 265, the network function NF_B registers with the NRF 232. At step 273, the network function NF_B cooperates with the NRF 232 to discover producer network functions with which the network function NF_B may cooperate. In the example, network function NF_B locates network function NF_C. At step 274, the network function NF_B establishes a session with network function NF_C. Session establishment may be according to standard network protocol and may include reporting information about the session to the NRF 232. The newly registered network function NF_B is ready for service at step 275. At step 276, the maintenance orchestrator 212 confirms that the network function NF_B has been activated.

Similar steps may be repeated for the network function NF_A and any other interdependent network processes. Thus at step 277, following confirmation that the network function NF_B has been activated, the maintenance orchestrator 212 issues an activate command to network function NF_A. Similar to the process for network function NF_C, at step 266 and for network function NF_B at step 272, at step 278 the network function NF_A registers with the NRF 232. At step 279, the network function NF_A cooperates with the NRF 232 to locate producer network functions with which the network function NF_A can cooperate. The network function NF_A locates network function NF_B. At step 280, the network function NF_A establishes a session with the network function NF_B and may report the new session to the NRF 232. At step 281, the network function NF_A is ready for service. At step 282, the maintenance orchestrator 212 confirms that the network function NF_C has been activated.

At step 283, the maintenance orchestrator 212 confirms to the operational personnel 222 that the activation of the group of dependent network functions has been successfully completed and the network functions are ready for service. Throughout the steps of method 260, if error conditions arise, the method may include reporting the error condition to the operational personnel 222 for further handling.

While for purposes of simplicity of explanation, the respective processes are shown and described as a series of blocks in FIG. 2C and FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of system 200, and method 230 presented in FIG. 1, FIG. 2A, FIG. 2B, FIG. 2C, FIG. 2D, and FIG. 3. For example, virtualized communication network 300 can facilitate in whole or in part identifying related network functions in the virtualized communication network 300 as well as dependencies among the network functions, identifying devices of the virtualized communication network 300 on which the network functions are instantiated and deactivating as a group the related network functions.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtual network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
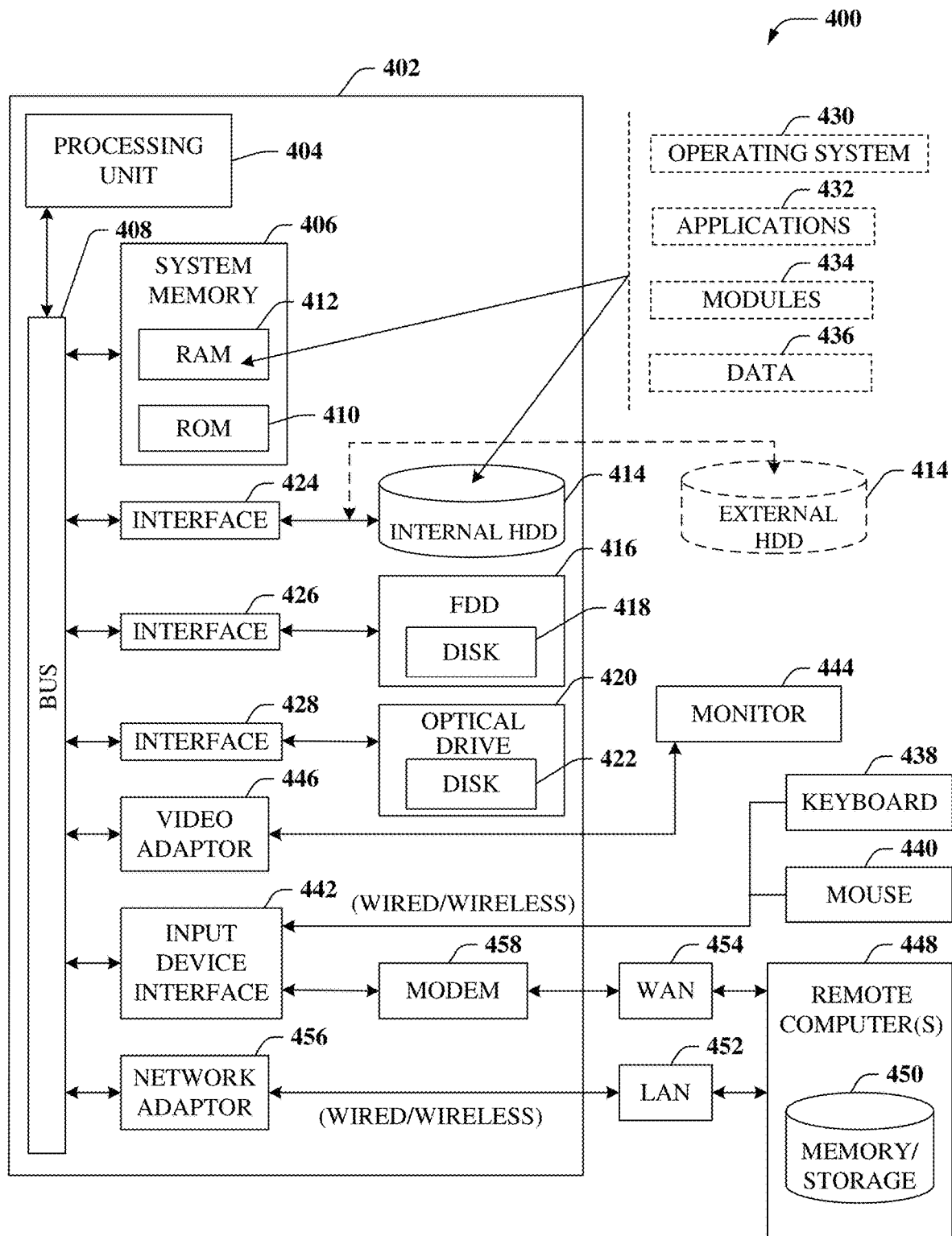
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part identifying related network functions in a core network and dependencies among the network functions, identifying devices of a cloud network on which the network functions are instantiated and deactivating as a group the related network functions.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
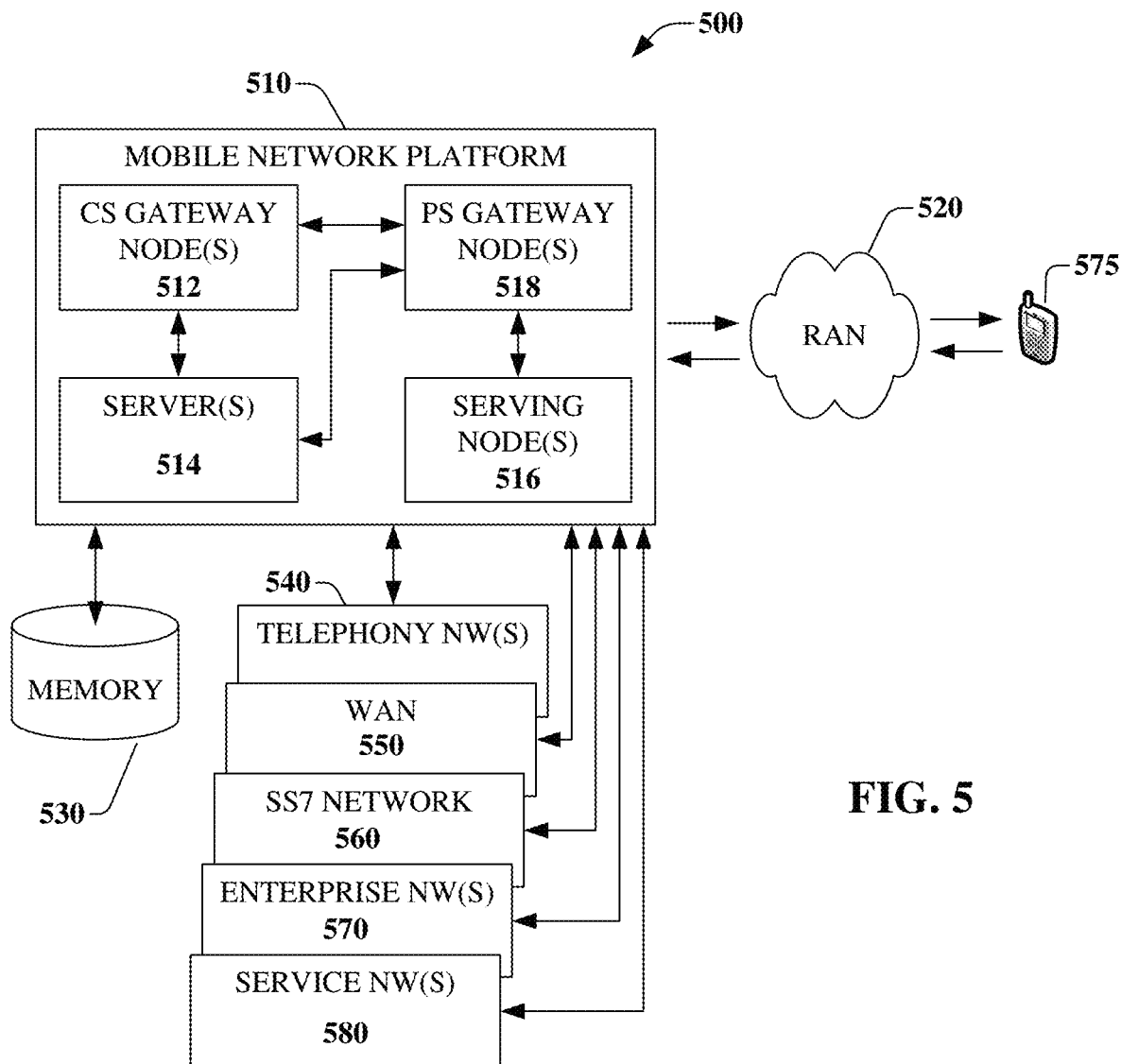
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part identifying related network functions in a mobile communications network including the mobile network platform 510 and dependencies among the network functions, identifying devices of a core network of the mobile communications system on which the network functions are instantiated and deactivating as a group the related network functions. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
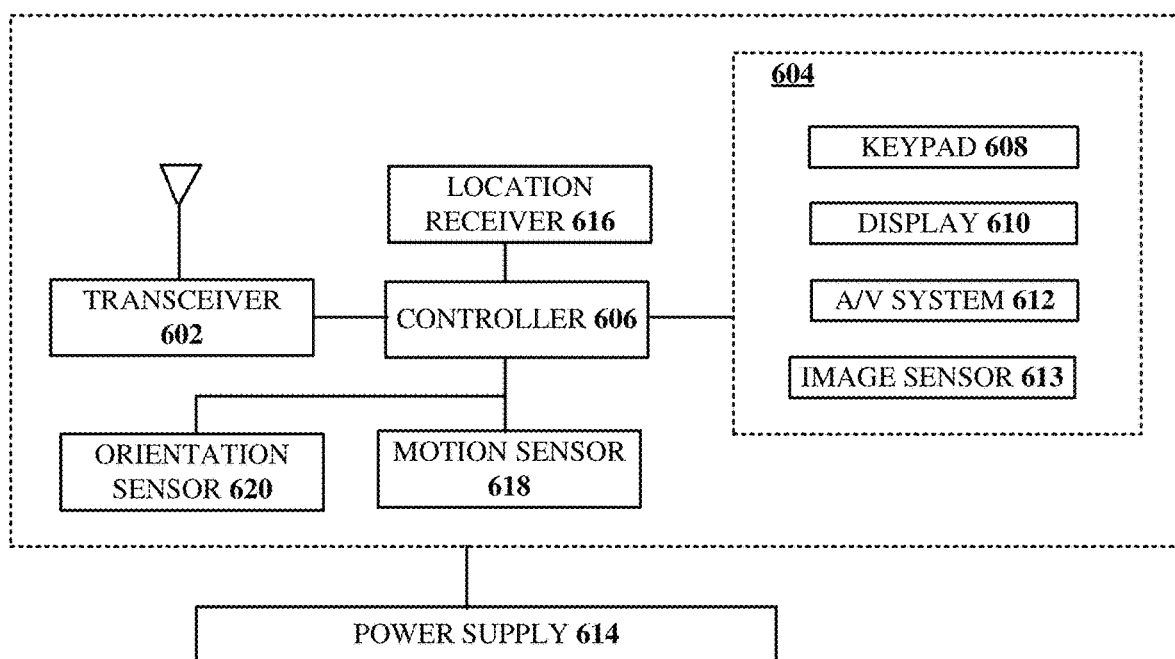
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part identifying related network functions in the core network of a mobile communications system and dependencies among the network functions, identifying devices of a cloud network on which the network functions of the core network are instantiated and deactivating as a group the related network functions.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving an operator instruction to deactivate a group of network functions in a core network of a mobile communications network, the group of network functions including a plurality of virtual network functions operating on computational devices of a cloud network;
identifying functional dependencies among the respective network functions of the group of network functions;
identifying one or more computational devices of the cloud network hosting the plurality of virtual network functions;
for each respective network function of the group of network functions,
deregistering the respective network function;
confirming a deactivation status for the respective network function; and
reactivating the respective network functions according to a predetermined maintenance sequence.

2. The device of claim 1, wherein the identifying one or more computational devices of the cloud network comprises:
receiving information associating the plurality of virtual network functions with one or more compute servers of the cloud network from a machine learning model.

3. The device of claim 2, wherein the operations further comprise:
receiving information identifying some or all compute servers of the core network; and
receiving information identifying subscribers to mobile network services who are connected to particular network functions of the group of network functions.

4. The device of claim 2, wherein the operations further comprise:
receiving, at the machine learning model, information about activities and processes among the plurality of virtual network functions; and
inferring, by the machine learning model, patterns of dependency among the plurality of virtual network functions, wherein the identifying functional dependencies among the respective network functions is based on patterns of dependency.

5. The device of claim 4, wherein the operations further comprise:
receiving, at the machine learning model, updated information about activities and processes among the plurality of virtual network functions, wherein the updated information is based on continuous operation over time of the core network; and
updating the patterns of dependency among the plurality of virtual network functions by the machine learning model, wherein the updating is based on the updated information.

6. The device of claim 4, wherein the receiving updated information about activities and processes among the plurality of virtual network functions comprises:
receiving information about currently connected subscribers in the mobile communications network and activities of the currently connected subscribers; and
receiving as historical information about transactions and events in the mobile communications network.

7. The device of claim 1, wherein the operations further comprise:
defining a sequence by which the respective network functions should be made unavailable before a predetermined event.

8. The device of claim 7, wherein the operations further comprise:
identifying functional dependencies among the respective network functions; and
defining the sequence by which the respective network functions should be made unavailable based on the functional dependencies.

9. The device of claim 1, wherein the reactivating further comprises:
receiving an operator instruction to reactivate the group of network functions in the core network.

10. The device of claim 9, wherein the operations further comprise:
for each respective network function of the group of network functions, registering the respective network function with a network repository function; and
establishing a session with at least one other network function.

11. A non-transitory, machine-readable medium, comprising executable instructions that, when executed by a processing system including a processor, facilitate performance of operations, the operations comprising:
   identifying a set of network functions operative on a core network of a mobile communications system;
   identifying functional dependencies among respective network functions of the set of network functions;
   defining a sequence by which the set of network functions should be made unavailable prior to a maintenance event, wherein the defining the sequence is based on the functional dependencies;
   deactivating respective network functions of the set of network functions according to the sequence; and
   reactivating the respective network functions according to a second sequence subsequent to the maintenance event.

12. The non-transitory, machine-readable medium of claim 11, wherein the operations further comprise:
   confirming the deactivating of respective network functions of the set of network functions according to the sequence.

13. The non-transitory, machine-readable medium of claim 12, wherein the operations further comprise:
   defining a second sequence by which the set of network functions should be made available subsequent to the maintenance event, wherein the defining the second sequence is based on the functional dependencies.

14. The non-transitory, machine-readable medium of claim 12, wherein the operations further comprise:
   receiving an operator command to begin a deactivation process for the set of network functions; and
   proceeding to deactivate the respective network functions according to the sequence without further operator involvement.

15. The non-transitory, machine-readable medium of claim 12, wherein the operations further comprise:
   for respective network functions of the set of network functions, confirming the deactivating of each respective network function prior to commencing deactivating a next respective network function according to the sequence.

16. The non-transitory, machine-readable medium of claim 12, wherein the confirming the deactivating of the respective network function comprises:
   initiating a validation test of the respective network function to verify the respective network function has been deactivated;
   receiving a result of the validation test; and
   initiating a retrial of the deactivating the respective network function, wherein the initiating the retrial is responsive to receiving a failure result of the validation test.

17. A method, comprising:
   defining, by a processing system including a processor, a set of related network functions of a core network of a mobile communications system, respective network functions of the set of network functions instantiated as virtual network functions on a cloud network;
   defining, by the processing system, dependencies between the respective network functions of the set of network functions;
   receiving, by the processing system, an operator command to deactivate the set of related network functions;
   identifying, by the processing system, one or more computing device of the cloud network hosting the set of related network functions;
   deactivating, by the processing system, respective network functions of the set of related network functions according to a predetermined sequence, wherein the deactivating is responsive to the operator command; and
   reactivating, by the processing system, the respective network functions according to a second predetermined sequence subsequent to a maintenance event.

18. The method of claim 17, comprising:
   receiving, by the processing system, information defining the computing device of the cloud network on which each respective network function is instantiated; and
   deactivating, by the processing system, the each respective network function on a computing device of the one or more computing devices of the cloud network.

19. The method of claim 18, wherein the receiving information defining the computing device comprises:
   receiving, by the processing system, information identifying a compute server on which the each respective network function is instantiated from a machine learning model.

20. The method of claim 17,
   wherein the reactivating the respective network functions is responsive to an operator command following completing of a maintenance procedure on a portion of the cloud network.

* * * * *